US008250177B2

(12) United States Patent
Honein

(10) Patent No.: US 8,250,177 B2
(45) Date of Patent: Aug. 21, 2012

(54) UNCACHED DATA CONTROL IN SERVER-CACHED PAGE

(75) Inventor: Jad Nachat Honein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 12/163,011

(22) Filed: Jun. 27, 2008

(65) Prior Publication Data
US 2009/0327404 A1 Dec. 31, 2009

(51) Int. Cl.
*G06F 15/16* (2006.01)
*G06F 17/00* (2006.01)

(52) U.S. Cl. .................. 709/218; 709/236; 715/202
(58) Field of Classification Search .......... 709/218
See application file for complete search history.

(56) References Cited

U.S. PATENT DOCUMENTS

| 6,219,676 | B1 | 4/2001 | Reiner |
| 6,605,120 | B1 * | 8/2003 | Fields et al. ............. 715/239 |
| 6,772,203 | B1 * | 8/2004 | Feiertag et al. .......... 709/219 |
| 6,789,170 | B1 | 9/2004 | Jacobs et al. |
| 6,836,774 | B2 * | 12/2004 | Melbin ..................... 709/217 |
| 6,964,009 | B2 * | 11/2005 | Samaniego et al. ...... 715/202 |
| 7,096,418 | B1 * | 8/2006 | Singhal et al. .......... 715/205 |
| 7,177,900 | B2 * | 2/2007 | Ims et al. ................. 709/201 |
| 7,237,030 | B2 | 6/2007 | Chakraborty et al. |
| 7,320,023 | B2 | 1/2008 | Chintalapati et al. |
| 7,536,389 | B1 * | 5/2009 | Prabhakar et al. ............. 1/1 |
| 7,590,704 | B2 * | 9/2009 | Yuan et al. ................ 709/217 |
| 2002/0010753 | A1 * | 1/2002 | Matsuoka et al. ......... 709/217 |
| 2003/0110296 | A1 * | 6/2003 | Kirsch et al. ............. 709/246 |
| 2003/0120752 | A1 * | 6/2003 | Corcoran .................. 709/219 |
| 2003/0188009 | A1 * | 10/2003 | Agarwalla et al. ........ 709/236 |
| 2004/0205564 | A1 | 10/2004 | Brayton et al. |
| 2004/0236824 | A1 | 11/2004 | Millington et al. |
| 2005/0188048 | A1 * | 8/2005 | Yuan et al. ................ 709/208 |

(Continued)

OTHER PUBLICATIONS

Post-Cache Substitution (7 pages) http://www.nikhilk.net/PostCacheSubstitution.aspx (Posted Saturday, Jan. 22, 2005) (Updated Jan. 23, 2005).

(Continued)

*Primary Examiner* — Peling Shaw
*Assistant Examiner* — Joiya M Cloud
(74) *Attorney, Agent, or Firm* — Workman Nydegger

(57) ABSTRACT

Dynamic processing markers for use with cached web pages. If a request for a cached web page is received at a server, the server can provide the cached web page to the client. However, if there are one or more processing markers associated with the cached page, the server may process the dynamic processing marker using information from the request. Potentially, the dynamic result of this processing may be provided with the cached web page to the client. Alternatively or in addition, the dynamic processing marker is provided to the client, whereupon the client provides the processing marker to another server that processes the marker. Accordingly, even cached web pages that are cached at the server side may cause appropriate processing by the server upon receiving a request for the web page.

17 Claims, 4 Drawing Sheets

U.S. PATENT DOCUMENTS

| | | | |
|---|---|---|---|
| 2006/0020883 A1* | 1/2006 | Kothari et al. | 715/513 |
| 2006/0064467 A1 | 3/2006 | Libby | |
| 2006/0265476 A1* | 11/2006 | Barger et al. | 709/219 |
| 2007/0113188 A1* | 5/2007 | Bales et al. | 715/742 |
| 2008/0005273 A1* | 1/2008 | Agarwalla et al. | 709/217 |
| 2008/0040425 A1* | 2/2008 | Hines | 709/203 |
| 2008/0195819 A1* | 8/2008 | Dumont | 711/138 |
| 2008/0281610 A1* | 11/2008 | Yoshida et al. | 705/1 |
| 2009/0160735 A1* | 6/2009 | Mack | 345/2.3 |

OTHER PUBLICATIONS

Dynamically Updating Portions of a Cached Page (2 pages) http://msdn2.microsoft.com/en-us/library/ms227429(VS.85).aspx (2008 Microsoft Corporation).

Manage Detail Pages across Multiple Platforms with Centralized Data Caching (7 pages) http://msdn2.microsoft.com/en-us/library/aa479301.aspx#cencachv3_topic2 (2008 Microsoft Corporation).

* cited by examiner

UNCACHED DATA CONTROL IN SERVER-CACHED PAGE

BACKGROUND

Web servers are configured to receive web page requests a server up the requested web page for each client. Often, in order to provide the requested web page, some server processing using server-side data is performed in order to generate the web page. If the server receives a large number of web page requests, this processing can be quite demanding on the server.

In order to alleviate the server-side processing, the server may often cache web pages. In other words, the web page is generated in advance by the server using server-side data. Then, when request for the web page come in, the server does not have to regenerate the web page for each request. The server simply provides the cached version of the web page in response to every client request, at least until the caching of the web page ends. At some future point, the server might cache a later version of the web page, which may then be used to satisfy subsequent client requests for the web page. The frequency at which the cached web page is updated is typically less than the frequency at which client requests are received, often much less, thereby resulting in a processing savings.

BRIEF SUMMARY

Embodiments described herein relate to the use of dynamic processing markers for use with cached web pages. If a request for a cached web page is received at a server, the server can provide the cached web page to the client. However, if there are one or more processing markers associated with the cached page, the server may process the dynamic processing marker using information from the request. Potentially, the dynamic result of this processing may be provided with the cached web page to the client. In one embodiment, the dynamic processing marker is provided to the client, whereupon the client provides the processing marker back to that server or to another server that processes the marker. Accordingly, even cached web pages that are cached at the server side may cause appropriate dynamic processing by the server upon receiving a request for the web page. Therefore, the cached web page may include some dynamic content, without the server having to dynamically regenerate the entire web page for each request.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, dynamic processing markers are used in conjunction with cached web pages. If a request for a cached web page is received at a server, the server can provide the cached web page to the client. However, if there are one or more processing markers associated with the cached page, the server may process the dynamic processing marker using information from the request. Potentially, the dynamic result of this processing may be provided with the cached web page to the client. In one embodiment, the dynamic processing marker is provided to the client, whereupon the client provides the processing marker back to the same or to another server that processes the marker. Therefore, the cached web page may include some dynamic content or cause some limited amount of dynamic processing to occur at the server, without the server having to dynamically regenerate the entire web page for each request. First, some introductory discussion regarding computing systems will be described with respect to FIG. 1. Then, various embodiments of the use of dynamic processing markers with cached web pages will be described with respect to FIGS. 2 through 4.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
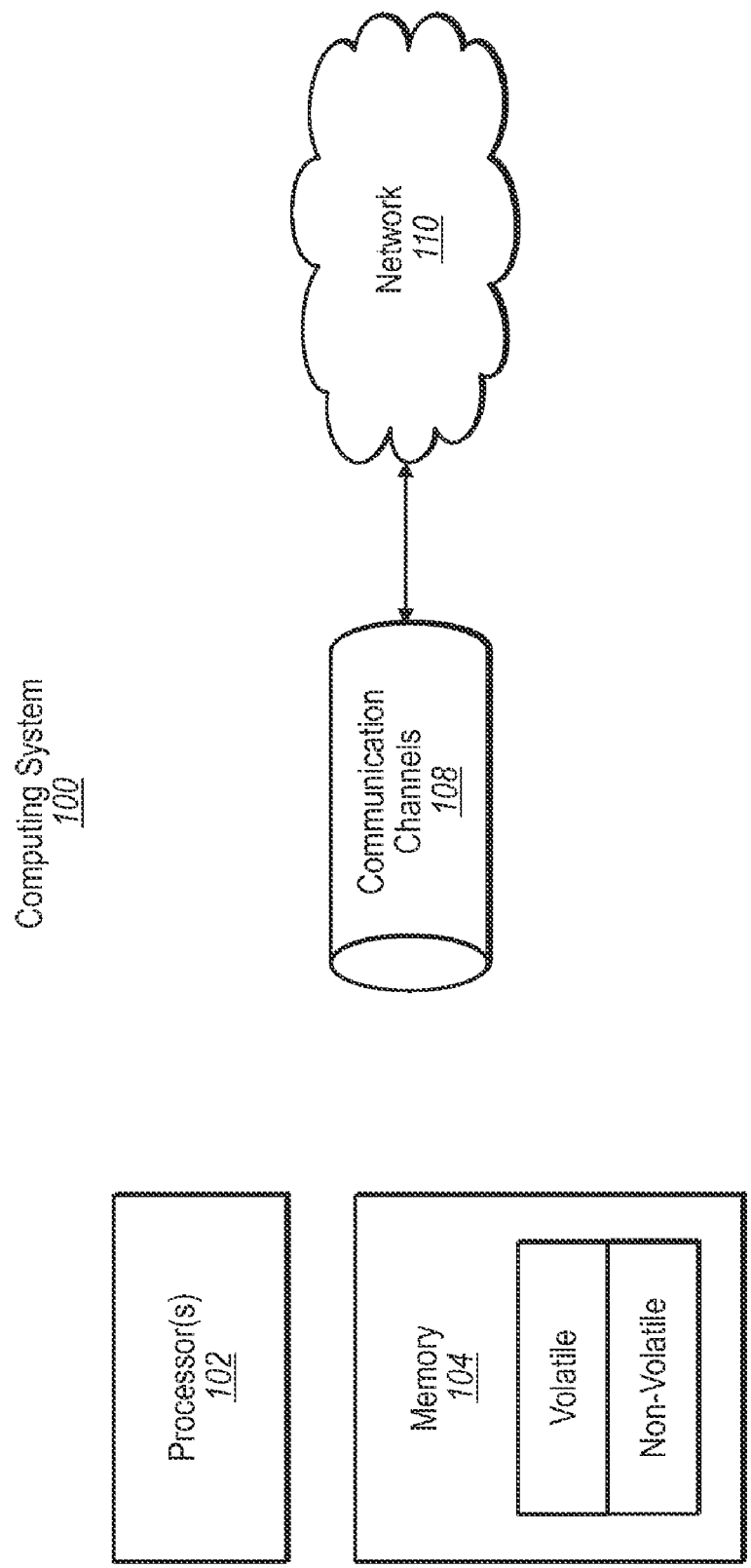
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Part of the acts directed by the processing unit(s) 102 may be to display certain information on a display 106. The display 106 is illustrated as being a particular form in FIG. 1. However, the nature and size of the display 106 may differ depending on the physical form of the computing system 100. Since the computing system 100 may take on a wide variety of physical forms, the display 106 may also have a wide variety of physical forms.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
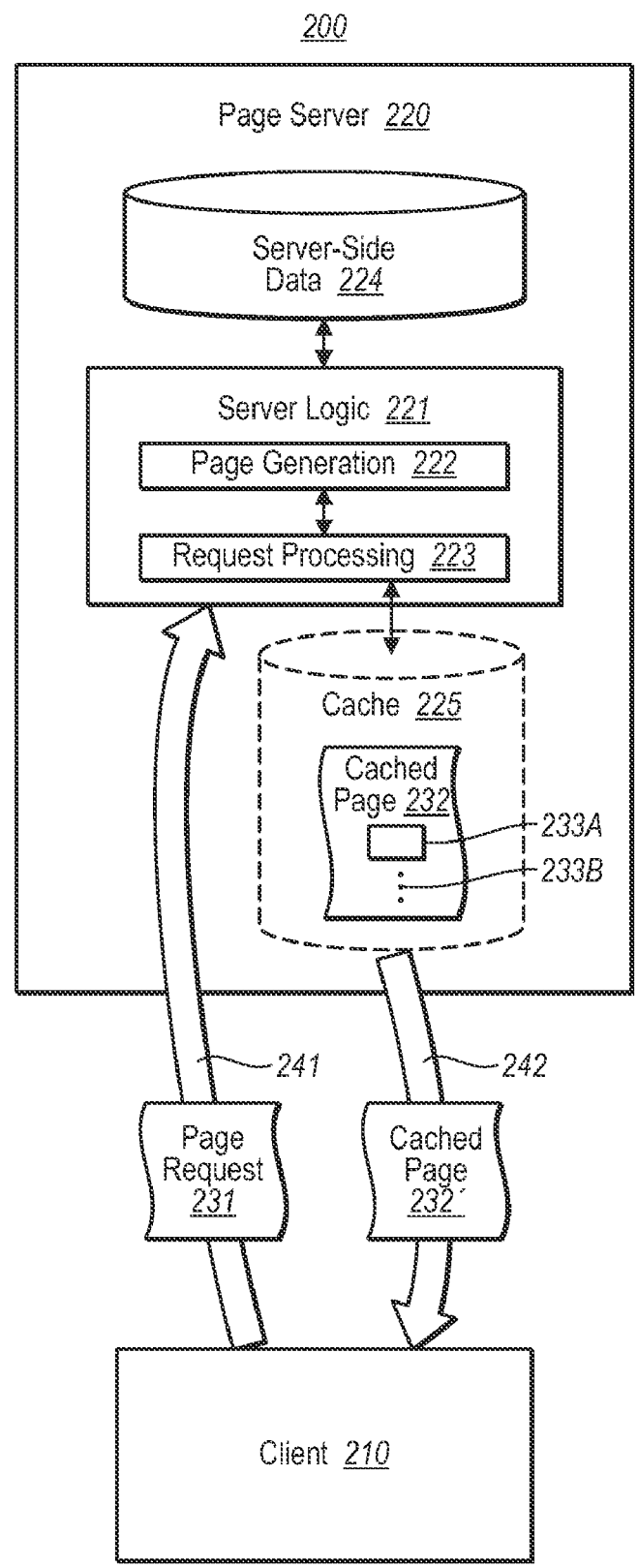
FIG. 2 illustrates an environment in which embodiments described herein might be employed.

FIG. 2 illustrates a network environment 200 in which the principles described herein may be practiced. The network environment 200 includes a web page server computing system 220 and a client computing system 210. Each of the web page server computing system 220 (hereinafter also referred to as a "web page server 220" or simply "server 220") and the client computing system 210 (hereinafter also referred to as a "client 210") may be structured as illustrated and described with respect to the computing system 100 of FIG. 1, although that need not be the case. First, the various components of the server 220 will be described, the various data flows and processing of FIG. 2 will be described with respect to FIGS. 3 and 4.

The web page server 220 includes server logic 221 that handles incoming web page requests, such as the web page request 231 received from the client 210 as represented by arrow 241. The server logic 221 includes a request processing module 223 that determines whether or not the requested page is cached in a cache 225. If the web page is not already cached, the page generation module 222 uses information provided in the web page request and/or server-side data 224 in order to generate a corresponding web page to return to the client.

On the other hand, if the web page is cached, the request processing module 223 returns a copy of the cached page to the client as represented by the cached page copy 232' being returned to the client 210 as represented by arrow 242. As will be described below, the copy of the web page 232' returned to the client 210 may, be need not, be somewhat different than the actually cached page 232. This difference might arise, for example, due to the server-side processing of dynamic processing marker 233A and potentially other dynamic processing markers 233B included within or associated with the cached page 232. The cached page 232 may include no dynamic processing controls, a single dynamic processing control, or multiple dynamic processing controls.

The server-side data 224 includes information available to the server. Such information may be subject to change, and may be used to processing dynamic processing markers associated with cached pages. The frequency at which the server-side data changes, and the sensitivity of that change to overall performance, may govern how frequently the cached web page is updated through regeneration of the web page.

The cache 225 may be any memory or storage capable of retaining a generated web page. The access speed, volatility, and size of the cache 225 is not relevant to the principles described herein, and will depend on the application. Although the cache 225 is only illustrated as including one web page, the cache 225 may include any number of web pages.

Figure 3:
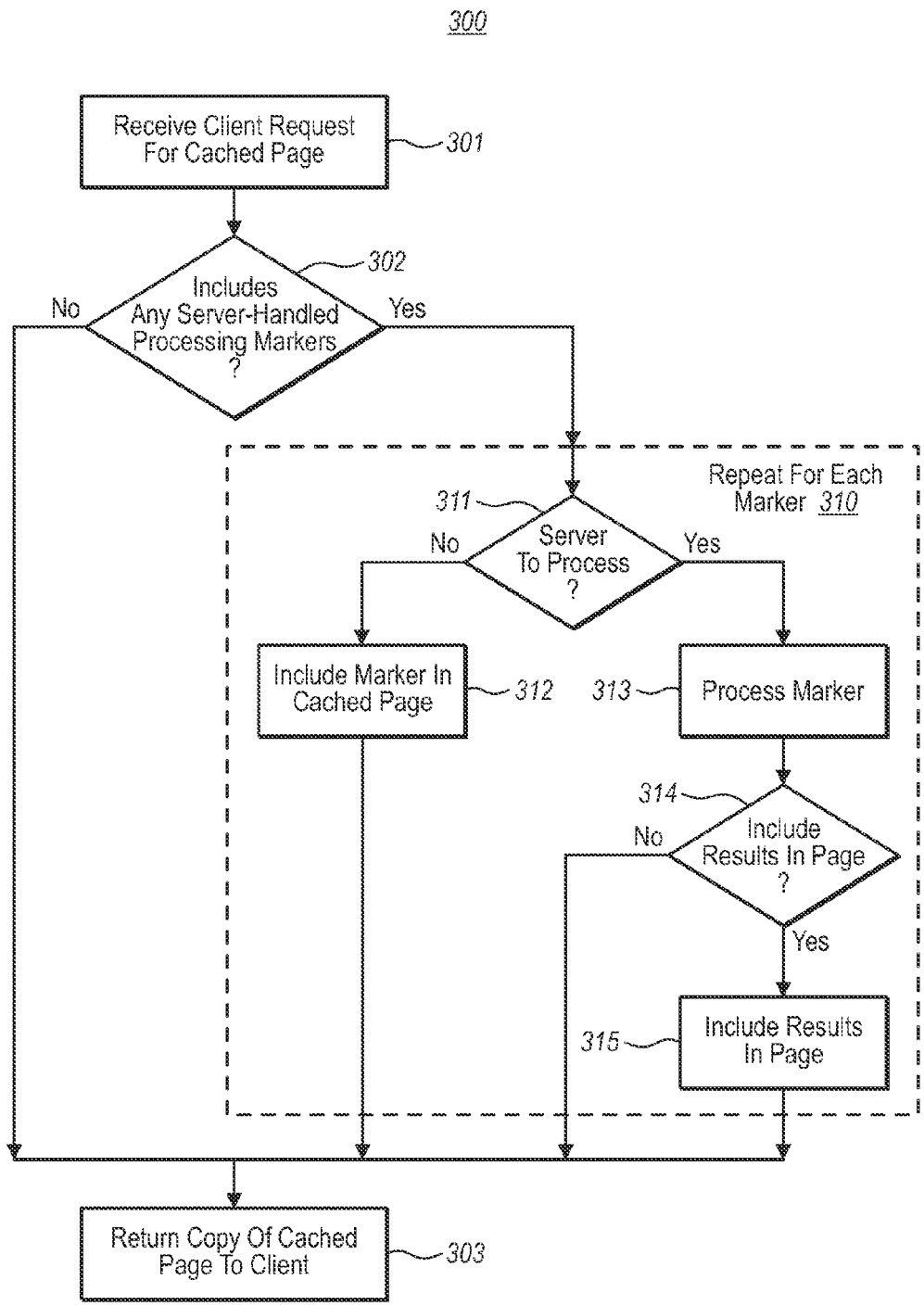
FIG. 3 illustrates a flowchart of a method for a server to handle a page request corresponding to a cached page.

FIG. 3 illustrates a flowchart of a method 300 for a server to respond to a client request for a web page. The method 300 of FIG. 3 will be described with frequent reference to the environment 200 of FIG. 2. The method 300 is performed in response to receiving a request from a client for a web page (act 201). While the request itself need not specify whether or not the web page is cached at the server, the principles described herein are most relevant when the web page is cached at the server. For instance, referring to FIG. 2, the server 220 receives the request 231 from the client for a web page 232, which happens to be cached in cache 225.

The web page server then determines whether or not the cached web page includes any dynamic processing markers that are to be handled by the server (decision block 302). If the server determines that the cached web page does not include any dynamic processing markers (No in decision block 302), or if the server does not (e.g., is not capable of or opts not to) make the determination (also No in decision block 302), a copy of the cached web page is provided to the client (act 303). In this case (No in decision block 302), the copy of cached web page returned to the client either does not include dynamic processing markers, or includes dynamic processing markers that have not been processed by the server. In the environment 200 of FIG. 2, the requested web page 232 does include at least one dynamic processing marker. Accordingly, this case does not apply to the example web page of FIG. 2.

If the server determines that the requested cached web pages does include one or more dynamic processing markers that are to be potentially handled by the server (Yes in decision block 302), the server may execute the logic in box 310 for each dynamic processing marker. The logic 310 may be managed by the request processing module 223 of the server logic 221 of FIG. 2.

Figure 4:
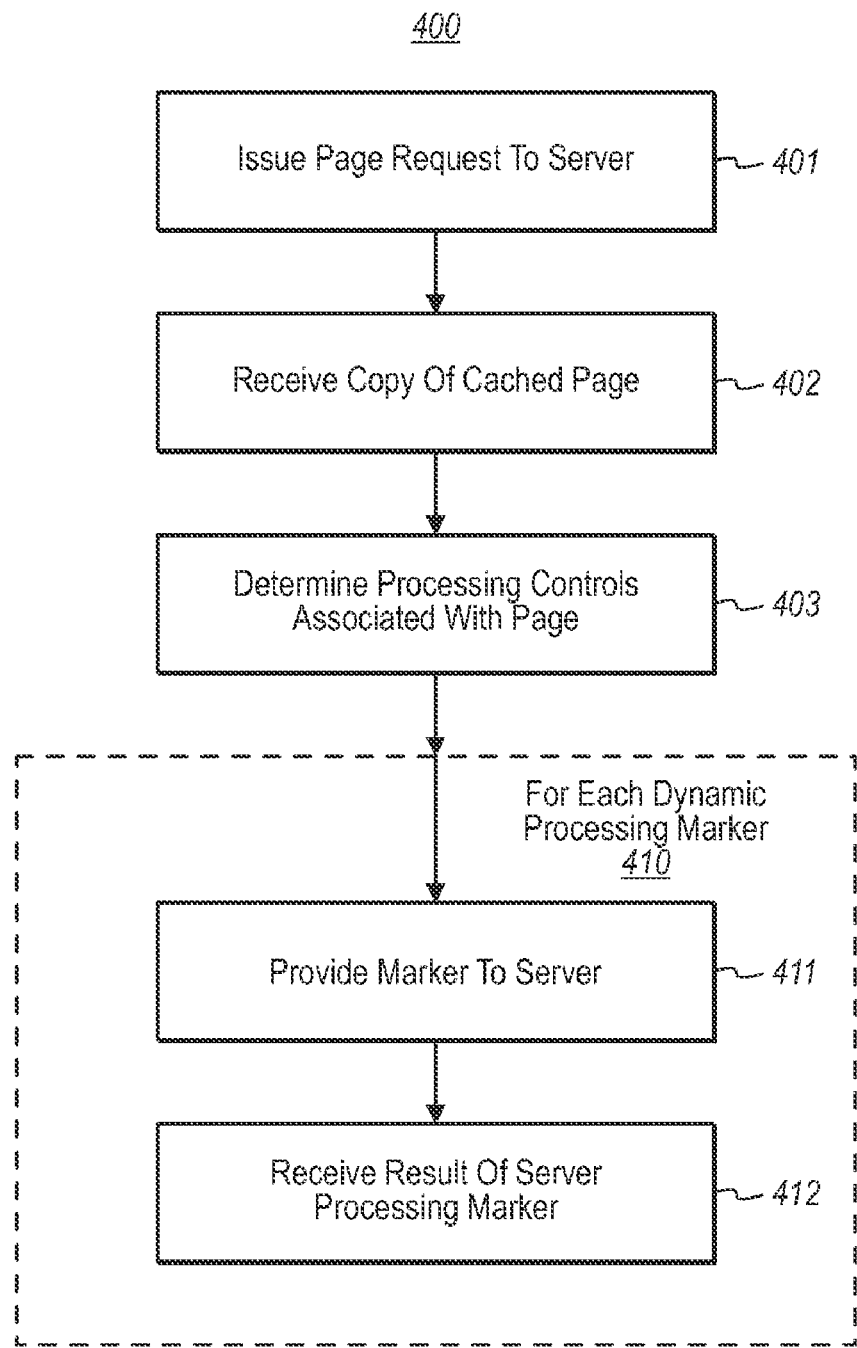
FIG. 4 illustrates a flowchart of a method for a client to acquire a page that has been cached at a server.

Specifically, if the server is not to handle a particular dynamic processing marker (No in decision block 311), the dynamic processing marker is included with the copy of the cached web page that is returned to the client (act 312), such that the client may determine what to do with the dynamic process marker. FIG. 4 illustrates a flowchart of a method 400 for the client to obtain and process a copy of a cached web page that potentially includes dynamic processing markers. However, the discussion of the client side processing will be delayed until completion of the description of FIG. 3, which discussed the server-side processing.

If the server is to handle a particular dynamic processing marker (Yes in decision block 311), the server processes the dynamic processing marker (act 313). For instance, the server may have a server control corresponding to the dynamic processing marker. The server control may use information provided within the request and/or may use server-side data in order to execute the server control. Referring to FIG. 2, for example, the page generation logic 222 may access the server-side data and/or may use information from the page request 231 in order to process the server control. In one embodiment, the input information from the page request may include client-specific information, or perhaps information specific to the user of the client making the request for the web page.

In the case where the server processes the dynamic processing marker (Yes in decision block 311 and act 313), the processing again my differ depending on whether that processing results in dynamic content that is to be returned with the copy of the cached web page to the client (decision block 314). If not (No in decision block 314), that dynamic content need not be placed in the copy of the cached page. On the other hand (Yes in decision block 314), the dynamic content generated as a result of the processing of the server control corresponding to the dynamic processing marker may be included in the copy of the cached web page (act 315), prior to the copy of the cached web page being returned to the client (act 303). If the dynamic content is included within the cached copy of the web page, that dynamic content may either be visible (i.e., affecting the rendering of the web page at the client), or invisible (e.g., having no effect on the rendering of the web page at the client).

To summarize, in the case of there being no server-handled processing markers in the cached web page (No in decision block 302), the following alternative status may apply to the copy of the cached web page returned to the client:
1) There are no dynamic processing markers in the cached web page, and thus there are no dynamic processing markers in the copy of the cached web page returned to the client; or
2) There are one or more dynamic processing markers in the copy of the cached web page that may be handled further by the client in order to cause the dynamic processing to occur.

In the case of there being at least one potential dynamic processing marker that is to be handled by the server (Yes in decision block 302), each dynamic processing marker may result in three possible outcomes, 1) the dynamic processing marker is not handled at the server and thus is included in the copy of the cached web page returned to the client, 2) the dynamic processing marker is handled at the server but does not result in dynamic content being included in the copy of the cached web page returned to the client, and 3) the dynamic processing marker is handled at the server and does result in dynamic content being included in the copy of the cached web page returned to the client. Accordingly, since there may be a single or multiple dynamic processing markers in the case where there are potential dynamic processing markers that are to be handled by the server (Yes in decision block 302), the following alternative status may apply in the case where there is at least one dynamic processing marker that is to be handled by the server:

1) There is only one dynamic processing marker in the cached web page, the server processed the server control corresponding to the dynamic processing marker, and the processing did not result in dynamic content being included in the copy of the cached page returned to the client;
2) There is only one dynamic processing marker in the cached web page, the server processed the server control corresponding to the dynamic processing marker, and the processing did result in dynamic content being included in the copy of the cached page returned to the client;
3) There are multiple dynamic processing markers in the cached web page, all of which handled by the server, wherein the server processed the server controls corresponding to each of the dynamic processing markers, and the processing of each did not result in dynamic content being included in the copy of the cached page returned to the client;
4) There are multiple dynamic processing markers in the cached web page, each of which handled by the server, wherein the server processed the server controls corresponding to each of the dynamic processing markers, and the processing of each did result in dynamic content being included in the copy of the cached page returned to the client;
5) There are multiple dynamic processing markers in the cached web page, each of which handled by the server, wherein the server processed the server controls corresponding to each of the dynamic processing markers, and the processing of one or more did not result in dynamic content being included in the copy of the cached page returned to the client, and the processing of one or more did result in dynamic content being included in the copy of the cached page returned to the client;
6) There are multiple dynamic processing markers in the cached web page, one or more of which were not handled by the server and thus the corresponding dynamic processing marker is included in the copy of the cached page, one of the dynamic processing markers being handled by the server, wherein the server processed the server control corresponding to the dynamic processing marker, and the processing did not result in dynamic content being included in the copy of the cached page returned to the client;
7) There are multiple dynamic processing markers in the cached web page, one or more of which were not handled by the server and thus the corresponding dynamic processing marker is included in the copy of the cached page, one of the dynamic processing markers being handled by the server, wherein the server processed the server control corresponding to the dynamic processing marker, and the processing did result in dynamic content being included in the copy of the cached page returned to the client;
8) There are multiple dynamic processing markers in the cached web page, one or more of which were not handled by the server and thus the corresponding dynamic processing marker is included in the copy of the cached page, and multiple dynamic processing markers being handled by the server, wherein the server processed the server controls corresponding to each of the dynamic processing markers handled by the server, and the processing of each did not result in dynamic content being included in the copy of the cached page returned to the client;

9) There are multiple dynamic processing markers in the cached web page, one or more of which were not handled by the server and thus the corresponding dynamic processing marker is included in the copy of the cached page, and multiple of the dynamic processing markers being handled by the server, wherein the server processed the server controls corresponding to each of the dynamic processing markers handled by the server, and the processing of each did result in dynamic content being included in the copy of the cached page returned to the client;

10) There are multiple dynamic processing markers in the cached web page, one or more of which were not handled by the server and thus the corresponding dynamic processing marker is included in the copy of the cached page, and multiple of the dynamic processing markers being handled by the server, wherein the server processed the server controls corresponding to each of the dynamic processing markers handled by the server, and the processing of one or more of the dynamic processing markers handled by the server did not result in dynamic content being included in the copy of the cached page returned to the client, and the processing of one or more of the dynamic processing markers result in dynamic content being included in the copy of the cached page returned to the client;

As one example implementation, suppose that the web page is a home page of a news outlet. The majority of the web page is to be the same for all clients, and thus the page is cached. However, there are several portions of the web page that includes polls. If the server wants the user or the client to vote only once on a particular issue, a dynamic control may be associated with each section. The corresponding server control is configured to identify the requesting entity for each web page request, consult voting records, and indicate a status for the user on whether or not they have voted. If, for example, they have voted, an element may be inserted into the copy of the cached web page that is returned to the client indicating the poll results, and indicating that the user or client has already voted. If they have not voted, element may be inserted into the same portion of the web page to allow the user to vote. This may be performed for multiple portions of the web page for multiple polls, some perhaps indicating that the user has already voted (regardless of whether the user used this or some other web page to vote previously) and showing the results, and some perhaps indicating that the user has not yet voted. This dynamic aspect is enabled even though the web page itself was cached.

FIG. 4 illustrates a flowchart of a method 400 for a client to request and process and cached web page. The method 400 may be performed by, for example, the client 210 of FIG. 2. Thus, the method 400 will be described with reference to the environment 200 of FIG. 2.

The method 400 includes the client issuing a request for a web page from a server (act 401). For instance, in FIG. 2, the client 210 issues the page request 231 to the server 220 as represented by arrow 241. Although the requested web page is cached at the server, the client may not be aware of that, and the request need not indicate that the requested web page is cached. The server can make the determination that the web page is cached on its own. The server-side processing illustrated and described with respect to FIG. 3 may then occur.

The client then receives that web page from the server (act 402). The web page is a copy of a web page that is cached at the server. The copy may include dynamic content, which may be rendered by the client's browser. For instance, in the above polling example, the dynamic content may include poll results or a poll control, depending on whether the user has already voted on the particular issue. The web page may also include one or more dynamic processing controls. Upon determining that the web page includes dynamic processing controls (act 403), the client is the notified that the there are dynamic processes that should occur with respect to that portion of the web page. In one embodiment, the dynamic processing controls that are included in the cached web page may be different than the dynamic processing controls that are included in the copy of the web page returned to the client. The function of the dynamic processing controls in the cached web page at the server is to cue the server to perform some dynamic processing or to at least notify the client that dynamic processing should occur and include sufficient information for the client to complete that processing. The dynamic processing control in the copy of the web page returned to the client may simply be that notification. Accordingly, the use a similar term "dynamic processing control" with respect to the cached web page at the server, and the same term also with respect to the copy returned to the client, should not be construed as requiring that the data structures of both be the same.

In response to the detection of a dynamic processing control, the client performs the logic of box 410 for each dynamic processing control. Specifically, the client provides the dynamic processing marker to a server (act 411). The server may be designated in the dynamic processing marker provided to the client. In some cases, the server to which the client goes to for processing of the dynamic processing marker may be the same as the web page server that provided the web page in the first place. In other cases, it may be different.

As an example, suppose that there is a centralized metrics server that keeps track of overall network traffic for multiple web page servers. When a client requests a web page from a particular web page server, even though that web page is cached at the web page server, a dynamic control may be provided with the copy of the cached web page returned to the client. That dynamic control may be provided by the client to the metrics server, allowing the metrics server to log the original request for the web page to the web page server. Thus, even though the web page servers perform caching, the statistics associated with those requests may still be tracked.

Accordingly, the principles described herein provide an effective mechanism for allowing servers to cache web pages, while still allowing for some dynamic processing associated with the cached web page. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a server to respond to a client request for a web page, the method comprising:
   an act of receiving, at a first server, a request from a client for a web page;
   an act of determining that a copy of the web page is cached;
   an act of determining that the copy of the web page includes a plurality of dynamic processing markers that identify that a plurality of portions of the copy of the web page requires dynamic content to be generated by the server using input information from the request from the client;

an act of executing a server control corresponding to a first of the plurality of dynamic processing markers using the input information from the request to generate the dynamic content to be included in the copy of the web page;

an act of returning the copy of the web page including the dynamic content and at least a second of the plurality of dynamic processing markers to the client without processing the second processing marker;

an act of receiving the second dynamic processing marker at a second server from the client;

an act of processing the second dynamic processing marker at the second server; and an act of returning a result of the processing of the second dynamic processing marker to the client.

2. A method in accordance with claim 1, wherein the input information comprises client-specific information.

3. A method in accordance with claim 1, wherein the first and second server are the same server.

4. A method in accordance with claim 1, wherein the dynamic content is not rendered at the client.

5. A method in accordance with claim 1, wherein the dynamic content comprises a polling history for the client or user of the client.

6. The method of claim 1, further comprising:

an act of the client receiving the copy of the web page including the second of the plurality of dynamic processing markers from the first server;

an act of the client determining that the web page includes the second dynamic processing marker; and an act of the client providing the second dynamic processing marker to the second server for processing.

7. A method in accordance with claim 6, further comprising:

an act of receiving the result of the processing from the second server to which the client provided the second dynamic processing marker.

8. A method in accordance with claim 7, wherein the result is a tracking of whether or not the client or the user of the client has already voted.

9. A method in accordance with claim 6, wherein the second server to which the second dynamic processing marker is provided is the same server as the first server that provided the copy of the web page to the client.

10. A method in accordance with claim 6, wherein the second server to which the second dynamic processing marker is provided is different than the first server that provided the copy of the web page to the client.

11. A method in accordance with claim 6, wherein the act of providing the second dynamic processing marker to the second server comprises an act of providing client or user-specific information to the second server.

12. A method in accordance with claim 11, wherein the act of processing the second dynamic processing marker at the second server comprises registering a request that contains the second dynamic processing marker to thereby allow the second server to monitor network traffic.

13. A computer program product comprising one or more physical computer-readable media having thereon computer-executable instructions that, when executed by one or more processors of a server, cause the server to perform the following upon receiving a request from a client for a web page:

an act of determining that a copy of the web page is cached;

an act of determining that the copy of the web page includes a plurality of dynamic processing markers that identify that a plurality of portions of the copy of the web page requires dynamic content to be generated by the server using input information from the request from the client;

an act of executing a server control corresponding to a first of the plurality of dynamic processing markers using the input information from the request and user server-side data to thereby generate the dynamic content to be included in the copy of the web page;

an act of embedding the dynamic content in the copy of the web page;

an act of returning the copy of the web page including the dynamic content corresponding to the first dynamic processing marker, as well as at least a second of the plurality of dynamic processing markers to the client without processing the second processing marker;

an act of receiving the second dynamic processing marker at the server from the client;

an act of processing the second dynamic processing marker at the server; and an act of returning a result of the processing of the second dynamic processing marker to the client.

14. A computing system comprising one or more processors and memory storing computer-executable instructions that, when executed by the one or more processors, cause the computing system to perform the following upon receiving a request from a client for a web page:

an act of determining that a copy of the web page is cached;

an act of determining that the copy of the web page includes a plurality of dynamic processing markers that identify that a plurality of portions of the copy of the web page requires dynamic content to be generated by the computing system using input information from the request from the client;

an act of executing a server control corresponding to a first of the plurality of dynamic processing markers using the input information from the request and user server-side data to thereby generate the dynamic content to be included in the copy of the web page;

an act of embedding the dynamic content in the copy of the web page;

an act of returning the copy of the web page including the dynamic content corresponding to the first dynamic processing marker, as well as at least a second of the plurality of dynamic processing markers to the client without processing the second processing marker;

an act of receiving the second dynamic processing marker at the computing system from the client;

an act of processing the second dynamic processing marker at the computing system; and an act of returning a result of the processing of the second dynamic processing marker to the client.

15. The computing system of claim 14, wherein the computing system comprises a plurality of servers.

16. The computing system of claim 15, wherein a first server receives the request for the web page and a second server receives the second dynamic processing marker from the client.

17. The computing system of claim 14, wherein the dynamic content comprises a polling history for the client or user of the client.

* * * * *